(12) United States Patent
Reuter

(10) Patent No.: US 8,107,675 B2
(45) Date of Patent: Jan. 31, 2012

(54) TRIGGER SYSTEM FOR DATA READING DEVICE

(75) Inventor: Richard Reuter, Wurselen (DE)

(73) Assignee: Cognex Corporation, Natick, MA (US)

( * ) Notice: Subject to any disclaimer, the term of this patent is extended or adjusted under 35 U.S.C. 154(b) by 1059 days.

(21) Appl. No.: 11/648,170

(22) Filed: Dec. 29, 2006

(65) Prior Publication Data

US 2008/0158365 A1 Jul. 3, 2008

(51) Int. Cl.
*H04N 5/225* (2006.01)
(52) U.S. Cl. ............. 382/103; 382/141; 348/207.1; 348/E5.024; 348/E3.02
(58) Field of Classification Search ............ 382/103, 382/141; 348/207.1, E5.024, E5.02
See application file for complete search history.

(56) References Cited

U.S. PATENT DOCUMENTS

| | | | | |
|---|---|---|---|---|
| 6,614,477 | B1* | 9/2003 | Lee et al. | 348/312 |
| 6,999,118 | B2* | 2/2006 | Suzuki | 348/226.1 |
| 2004/0218804 | A1* | 11/2004 | Affleck et al. | 382/141 |
| 2006/0133657 | A1* | 6/2006 | Schmid et al. | 382/128 |
| 2009/0196526 | A1* | 8/2009 | Schmid et al. | 382/278 |

* cited by examiner

*Primary Examiner* — Stephen Koziol
(74) *Attorney, Agent, or Firm* — Quarles & Brady LLP

(57) ABSTRACT

A data reader comprises a camera that has an adjustable resolution and acquisition speed. The camera is maintained at a low level resolution and fast speed and is periodically actuated to acquire images. When an acquired image indicates that an object is present, the resolution of the camera is increased, and a higher resolution image is acquired and decoded. The imaging system of the camera is therefore used to trigger data acquisitions, thereby eliminating the need for external triggers and sensor devices.

20 Claims, 3 Drawing Sheets

TRIGGER SYSTEM FOR DATA READING DEVICE

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

The present invention relates to methods and devices for triggering image data acquisition in a data reader.

BACKGROUND OF THE INVENTION

During mass production, packaging, shipping and other manufacturing, warehousing and retail processes, automated motion devices, including, for example, automated guided vehicles and conveyor belts, are used extensively to transport both component parts, manufactured components, completed products and packages between stations. To track the movement of these components, the parts on the conveyor belt or automated motion device are often marked with identifying symbols such as bar codes, data matrixes, symbols, identifying characters or other types of identifying data. This data is imaged by machine vision systems or other data reading devices that include a camera for acquiring image data. After the image data is acquired, the data is decoded using a variety of advanced techniques including, for example, pattern recognition, and the data is used to track the movement of objects.

Typically, in a system of this type, an emitter/detector or other type of motion sensor is provided to detect an object approaching the camera or imaging system and to trigger the acquisition of data. These sensors are hard wired to the conveyors or elsewhere along the expected path of a moving object, and therefore add not only cost, but complexity to the wiring of the overall system. These sensors, therefore, make installation of the system more difficult. Moreover, these triggering systems render the resulting automated system more difficult to troubleshoot when problems occur, a problem that is particularly important in automated manufacturing processes where "down time" is extremely costly. A need remains, therefore, for a system and method for inexpensively, accurately and efficiently triggering an imaging system to acquire data.

SUMMARY OF THE INVENTION

The present invention provides a method for triggering a data reader to acquire a high resolution, decodable image, by using the imaging system contained in the camera rather than external devices. The present invention therefore provides a data reader with improved reliability and decreased cost.

In one aspect, the present invention provides a method for triggering image acquisition in a data reading system comprising a camera and a light source. The method comprises the steps of adjusting a resolution of the camera to a low level resolution, periodically acquiring images with the camera at the low level resolution, and evaluating the acquired images to determine whether the image contains an object. When an object is detected, the resolution of the camera is increased to a high resolution, and an image of the object is acquired. The high resolution image can then be analyzed to decode data encoded on the object.

In another aspect, the present invention provides a data reading system comprising a reader including a light source and a camera having an adjustable resolution, and a controller for controlling image acquisition in the camera. The controller is adapted to periodically acquire an image at a low resolution, evaluate the acquired image to determine if the image includes an object, and increase the resolution of the camera when the image includes an object. When the resolution is increased, an additional image is acquired, and the resolutions is returned to the lower level, high speed acquisition rate. Data acquired in the high resolution image can then be analyzed and decoded.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
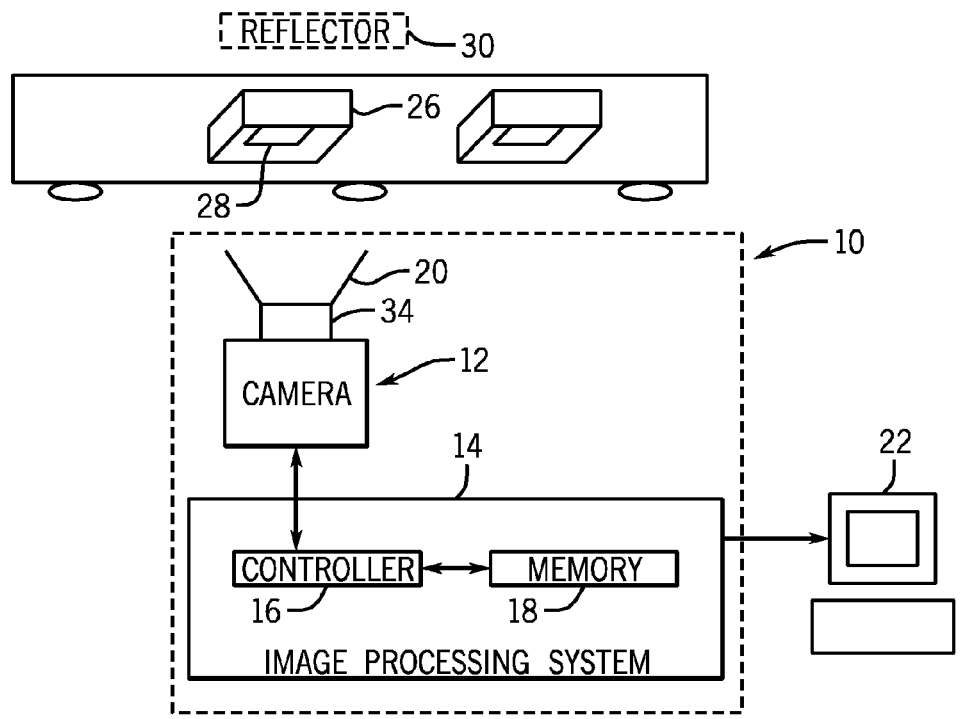
FIG. 1 is a perspective view of a data reader constructed in accordance with the present invention in use monitoring a conveyor.

Referring now to the Figures and more particularly to FIG. 1, a data reader 10 constructed in accordance with the present invention is shown. The data reader 10 comprises a camera 12 which can include an optical system 34 and one or more light source 20. The camera 12 is coupled to an image processing system 14 that includes a controller 16 and a memory element 18. The image processing system 14 includes a frame grabber for creating a series of fixed images from the image stream generated by the camera 12, and a vision application for decoding or otherwise processing the images acquired by the camera 12, and may be connected to an operator terminal 22. In operation, the controller 16 adjusts the resolution of the camera 12 to acquire low resolution image data until an object is detected, and triggers a high resolution image acquisition mode only when an object is detected, as described more fully below.

Referring still to FIG. 1, the camera 12 is positioned adjacent a conveyor 24 or adjacent a path for moving objects 26. The moving objects 26 each include an identifying mark 28 which can be, for example, a bar code, a data matrix, a series of characters, a direct part mark, or other data or symbols which can be imaged by the camera 12 and decoded by the image processing system 14. Optionally, a reflector 30 can be positioned on the opposing side of the conveyor 24 from the camera 12 to reflect light from the light source 20 back to the camera 12 when no object 26 is in the path of the reader 10, as described below.

Figure 2:
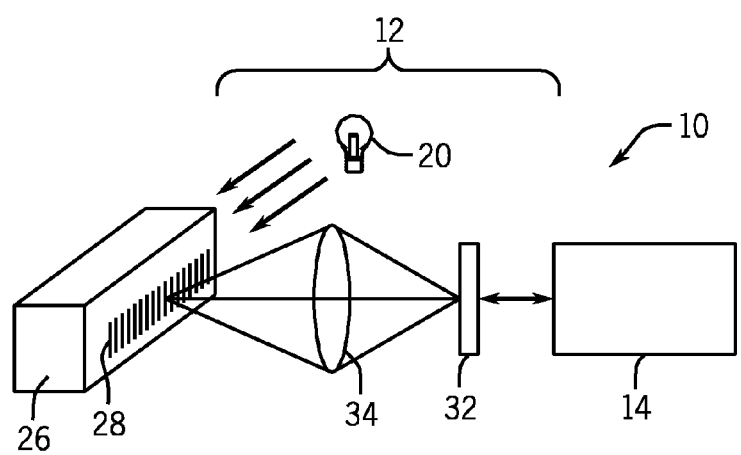
FIG. 2 is a perspective view of the data reader of FIG. 1 illustrating internal components of the camera.

Referring now to FIG. 2, a block diagram of the data reader 10 is shown. As described above, the data reader 10 includes a camera 12, a light source 20, and an image processing system 14 which, referring again to FIG. 1, can include a controller 16 and memory component 18 for decoding images. The camera 12 includes an imaging sensor 32 and optical system 34 including a lens for gathering ambient light reflecting from the identifying mark 28, and focusing the gathered light on the imaging sensor 32.

Referring still to FIG. 2, the imaging sensor 32 is preferably a single-chip CMOS or CCD imaging device including an array of imaging pixels, and which is capable of selectively acquiring both high and low resolution images either through the control of an on-board controller or through external control. Specifically, for the present application, the imaging sensor 32 is capable of selectively imaging objects 26 at a reduced resolution at a relatively high rate of speed, and at a high resolution at a normal speed which allows for the decoding of data found on the identifying mark 28. The resolution of the image acquisition can be adjusted in a number of ways. For example, the imaging sensor 32 can be selected to be capable of acquiring images at a variety of frame rates, e.g. by adjusting the number of rows of data acquired per image, capable of acquiring an image with a reduced set of pixels or reduced region of interest within the field of view, or capable of acquiring images at varying speeds by adjusting the exposure. Various other methods of adjusting the resolution and/or increasing the acquisition speed of the imaging process which would be suitable will be apparent to those of skill in the art. In particular, imaging sensors that include a global shutter or electronic exposure are suitable for the application. Although many such devices are available, one exemplary imaging sensor is the CMOS MT9V022, commercially available from Micron Technologies of San Jose, Calif.

Figure 3:
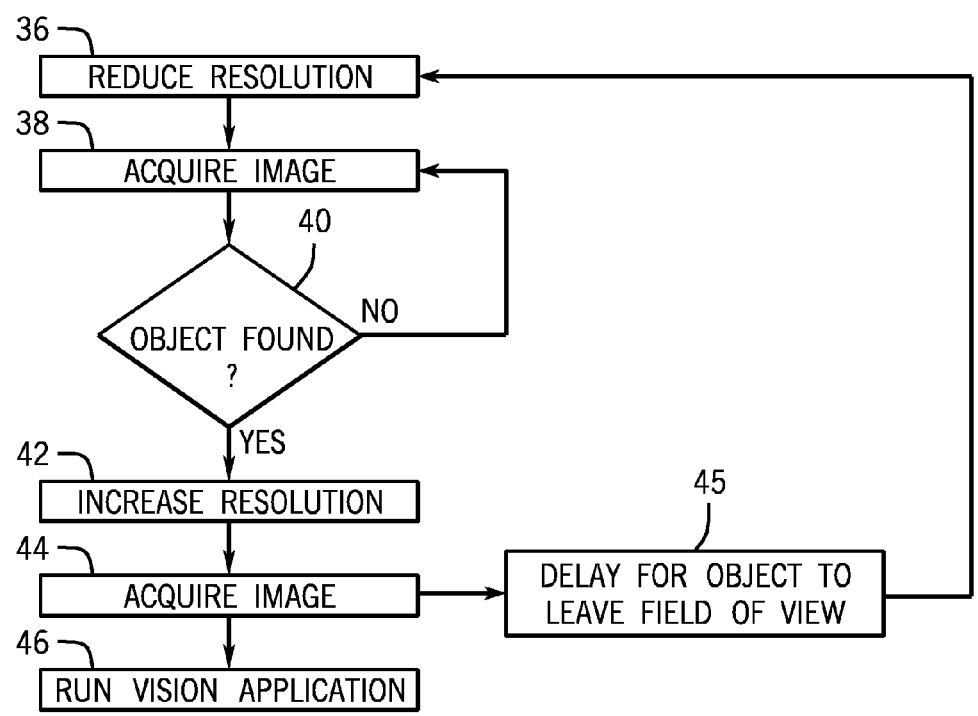
FIG. 3 is a flow chart illustrating a method for triggering the data reader of FIG. 1 in accordance with the present invention.

Referring now to FIG. 3, a flow chart illustrating the operation of the controller 16 to trigger the acquisition of an image of an object 26 is shown. In step 36, the resolution of the camera 12, and more specifically of the internal imaging sensor 32, is reduced to a comparatively low level at which a low resolution image can be acquired at a relatively high rate of speed. The resolution level is selected to provide sufficient data to the image processing system 14 to allow the system to differentiate between the presence and absence of an object, and to allow image data to be acquired at sufficient speeds to monitor the moving objects. In step 38, the imaging sensor is triggered to acquire an image. In step 40, the image is examined by the image processing system 14 to determine whether an object 26 is located within the acquired image. If not, the controller 16 returns to step 38 acquire another image.

If an object 26 is found in the acquired image data, the controller 16 switches the resolution of the camera 12 to a higher resolution which provides a more accurate image but acquires data at a slower rate than the image acquisition of step 38. In step 44, an image is again acquired, this time at the higher resolution selected to allow decoding of the identifying data 28. In step 46, a vision application, such as a decoding algorithm, optical character recognition, or other application, is executed in order to decode the identifying data 28 found in the acquired image or images. After the image as acquired, and either before or during the execution of the vision application, the controller 16 waits until the object 26 has left the field of view of the camera 12 (step 45) and again reduces the resolution of the imaging sensor 32 at step 36, again acquires an image in step 38, and continues to step through the process described above while objects 26 are to moving through the system to be identified. The process as shown and described with reference to FIG. 3, therefore, uses the imaging sensor 32 in the camera 12 to provide a high speed trigger for determining when a high resolution image of an object 26 is to be acquired, thereby eliminating or substantially reducing the need for external devices and sensors to trigger the camera when an object is approaching.

Figure 4:
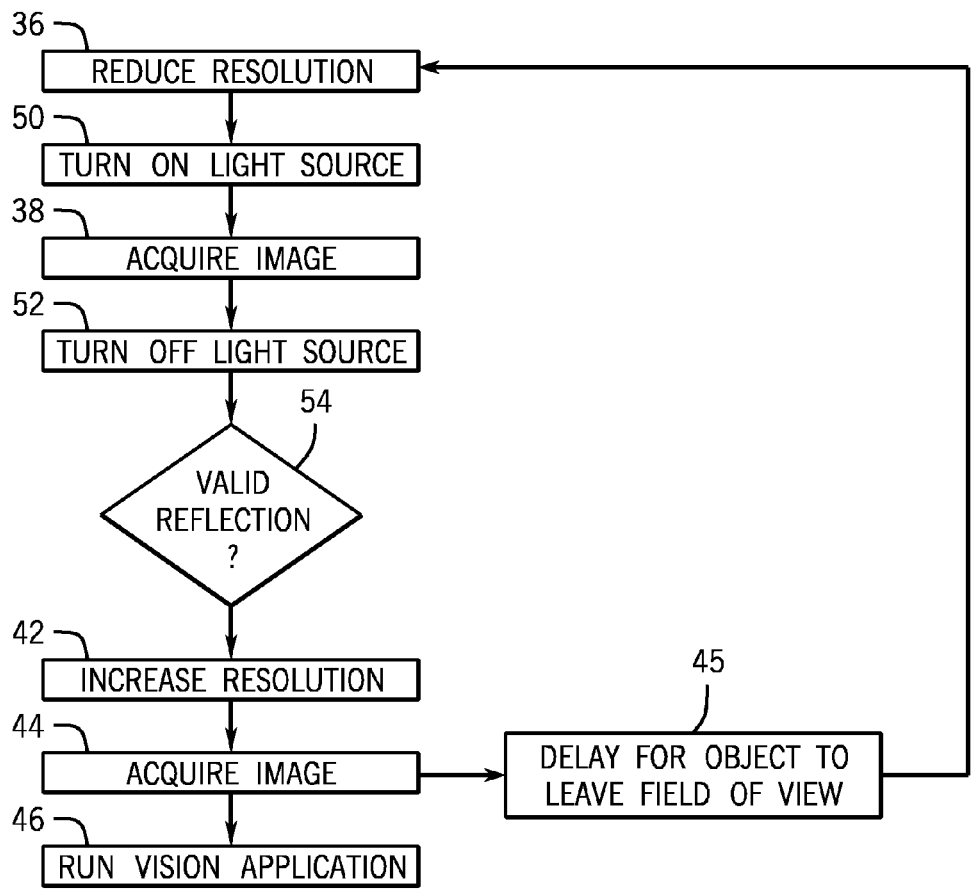
FIG. 4 is a flow chart illustrating an alternative method for triggering the data reader of FIG. 1.

Referring now to FIG. 4, a second flow chart illustrating a second embodiment of a method for triggering a camera 12 to acquire high resolution images for decoding in accordance with the present invention is shown. Here, the system also includes a reflector 30, as described above with reference to FIG. 1. In the description below, the steps of FIG. 4 that correspond to the steps described above with reference to FIG. 3 are designated with the same reference numerals.

Referring still to FIG. 4 and also to FIGS. 1 and 2, in step 36, the resolution of the imaging sensor 32 is reduced to provide a comparatively low resolution, high speed image. After the resolution is reduced, the light source 20 is activated (step 50), and an image is acquired (step 38). After the image is acquired, the light source 20 is deactivated to conserve energy (step 52). The image acquired in step 38 is then evaluated to determine whether the image includes a reflection of the light source 20 from the reflector 30 of FIG. 1. If so, the field of view of the camera 12 was not blocked by an object 26 and the controller returns to step 50 where, again, the light source 20 is activated. Although as described here, the light source is turned on and off between each image acquisition, these steps are intended to save energy, and can be omitted, or performed at other stages of the process.

Referring still to FIG. 4, if a reflection is not found in the image acquired in step 38, the path between the camera 12 and the reflector 30 is blocked by an object 26, and the resolution of the image sensor 32 is switched to a higher resolution necessary for acquiring decodable data in step 42. In step 44, another image is acquired and, as described above in step 46, a vision application is executed to decode or otherwise read the data acquired image. After or while the vision application is being executed, in step 36, the controller 16 waits for the object 26 to leave the field of view (step 45), and then decreases the resolution of the imaging sensor 32 to the low resolution, high speed level. As described above, the light source 20 can also be activated before the image is acquired in step 44, and deactivated after the image is acquired.

The present invention therefore provide a method and apparatus for triggering a data reader to acquire an image of an object 26 of sufficient resolution to allow decoding of an identifying mark 28 only when an object is in the field of view of the camera 12 in the data reader 10. When an object 26 is not in the field of view of the camera 12, the resolution is reduced to a low resolution, high speed acquisition mode which can be used to trigger the camera 12 to acquire these higher resolution images.

Although the specifics of a particular application depend on the selected imaging sensor 32, speed of the moving objects 26 and other factors, when using the Micron CMOS MT9V022 imaging sensor described above, the frame rate can be adjusted between less than one hundred frames per second to acquire high resolution images and fifteen hundred frames per second for acquiring low resolution images. The acquisition time for the high resolution image is relatively slow, between, for example ten and twenty milliseconds, while for the low resolution image acquisition, the acquisition time is relatively high, about one hundred microseconds.

A preferred embodiment of the invention has been described in considerable detail. Many modifications and variations to the preferred embodiment described will be apparent to a person of ordinary skill in the art. For example, although the camera 12 is shown coupled to an external controller 16 in the image processing system 14, it will be apparent to those of skill in the art that the controller and/or processing system 14 can be incorporated into the camera 12, be provided as a separate component, or positioned in an operator terminal 22 as shown in FIG. 1. Additionally, although the light source 20 is described as part of the camera 12 above, this component can also be external to the system. Furthermore, as described above, the imaging sensor of the present invention can provide a lower-resolution image at an increased rate of speed in any of a number of ways. It should be understood, therefore, that the methods and apparatuses described above are only illustrative and do not limit the scope of the invention, and that various modifications could be made by those skilled in the art that would fall within the scope of the invention. To apprise the public of the scope of this invention, the following claims are made:

I claim:

1. A method for triggering image acquisition in a data reading system comprising a camera and a light source, the method comprising the following steps:
    (a) lowering a resolution of the camera;
    (b) periodically acquiring images with the camera at the lowered resolution;
    (c) evaluating the acquired images to determine whether the image contains an object;
    (d) repeating steps (b) and (c) until the acquired image contains the object;
    (e) increasing the resolution of the camera to a high resolution higher than the lowered resolution;
    (f) acquiring an image of the object with the camera at the high resolution; and
    (g) returning to step (a).

2. The method as recited in claim 1, further comprising the step of decoding a symbol in the acquired image of the object.

3. The method as recited in claim 1, further comprising the step of identifying a path for moving a plurality of objects and positioning the camera adjacent the path.

4. The method as recited in claim 1, further comprising the step of activating the light source prior to acquiring the image and deactivating the light source after acquiring the image.

5. The method as recited in claim 1, wherein step (a) comprises increasing a frame rate of the camera.

6. The method as recited in claim 1, wherein step (e) comprises the step of reducing a frame rate of the camera.

7. The method as recited in claim 1, further comprising the step of processing the image.

8. The method as recited in claim 1, further comprising the step of providing a reflector opposite the camera.

9. The method as recited in claim 8, wherein step (c) comprises the step of evaluating the image to determine if the image includes a reflection of the light source from the reflector.

10. A data reading system comprising:
    a reader including:
        a light source; and
        a camera having an adjustable resolution;
    a controller for controlling image acquisition in the camera, the controller being adapted to:
        (a) periodically acquire an image at a selected initial resolution;
        (b) evaluate the acquired image to determine if the image includes an object
        (c) increase the resolution of the camera when the image includes an object to acquire an image data set capable of analysis;
        (d) acquire an additional image at the increased resolution; and
        (e) reset the resolution to the initial resolution and return to step (a).

11. The data reading system as recited in claim 10, wherein the processor is further adapted to activate the light source prior to acquiring the image and deactivate the light source after acquiring the image.

12. The data reading system as recited in claim 10, wherein the processor is further adapted to process the additional image.

13. The data reading system as recited in claim 10, wherein the additional image includes a symbol and the controller is further adapted to decode the symbol.

14. The data reading system as recited in claim 10 further comprising a conveyor for moving a plurality of objects in front of the camera.

15. The data reading system as recited in claim 10, further comprising a reflector, the reflector being positioned opposite the camera to reflect light emitted by the light source back to the camera.

16. The data reading system as recited in claim 10, wherein the controller is adapted to evaluate the acquired image by determining if the image is of light reflected from the light source.

17. The data reading system as recited in claim 10, further comprising a conveyor, and wherein the camera is coupled to the conveyor.

18. The data reading system as recited in claim 10, wherein changing the resolution of the camera increases or decreases the frame rate of the camera.

19. The data reading system of claim 10, wherein the camera comprises an imaging sensor and an optical element for focusing light.

20. A data reading system comprising:
    a reader including:
        a light source; and
        a camera having an adjustable acquisition speed;
    a controller for controlling image acquisition in the camera, the controller being adapted to:
        (a) periodically acquire an image at a high rate of speed;
        (b) evaluate the acquired image to determine if the image includes an object;
        (c) decrease the acquisition rate of the camera to a reduced rate of speed lower than the high rate of speed when the image includes an object to acquire an image data set capable of analysis;
        (d) acquire an additional image at the reduced rate of speed; and
        (e) reset the acquisition rate to the high rate of speed and return to step (a).

* * * * *